United States Patent
Sugiyama et al.

(10) Patent No.: US 8,259,247 B2
(45) Date of Patent: Sep. 4, 2012

(54) LIQUID CRYSTAL DISPLAY DEVICE

(75) Inventors: Saori Sugiyama, Chyosei (JP); Yasuyuki Yamada, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 509 days.

(21) Appl. No.: 12/618,877

(22) Filed: Nov. 16, 2009

(65) Prior Publication Data

US 2010/0123864 A1 May 20, 2010

(30) Foreign Application Priority Data

Nov. 18, 2008 (JP) .................. 2008-294018

(51) Int. Cl.
*G02F 1/1333* (2006.01)
(52) U.S. Cl. .............. 349/40; 349/138; 349/152
(58) Field of Classification Search .......... 349/40, 349/54, 152, 149, 158, 138
See application file for complete search history.

(56) References Cited

U.S. PATENT DOCUMENTS

| 6,034,757 A | 3/2000 | Yanagawa et al. |
| 7,796,224 B2 * | 9/2010 | Aota et al. ........ 349/139 |
| 2009/0086114 A1 * | 4/2009 | Higuchi et al. ........ 349/12 |

FOREIGN PATENT DOCUMENTS

| JP | 09-105918 | 4/1997 |
| JP | 2007-140353 | 6/2007 |

* cited by examiner

*Primary Examiner* — Thoi Duong
(74) *Attorney, Agent, or Firm* — Antonelli, Terry, Stout & Kraus, LLP.

(57) ABSTRACT

A liquid crystal display device includes: a first substrate having a first portion and a second portion; a pad formed in the first portion; a second substrate facing the second portion; a conductive film formed on the opposite face of the second substrate from the face facing the first substrate; liquid crystal arranged between the first substrate and the second substrate; a conductive resin disposed on the pad so as to extend on the conductive film and electrically connecting the pad with the conductive film; and an insulating layer formed on the first substrate and including a dam part arranged next to the conductive resin in the first portion. The height from the surface of the pad to the surface of the conductive film is 0.31 mm or less in a position avoiding the insulating layer.

19 Claims, 4 Drawing Sheets

LIQUID CRYSTAL DISPLAY DEVICE

CROSS-REFERENCE TO RELATED APPLICATION

The present application claims priority from Japanese application JP 2008-294018 filed on Nov. 18, 2008, the content of which is hereby incorporated by reference into this application.

BACKGROUND OF THE INVENTION

1. Field of the Invention

The present invention relates to a liquid crystal display device.

2. Description of the Related Art

In liquid crystal display devices of a lateral electric field system, it has been known that a conductive film is formed on an outer surface of a liquid crystal display panel for preventing the occurrence of abnormality of display when a high potential such as of static electricity is applied externally (JP-1997-105918 (patent family: U.S. Pat. No. 6,034,757)). In JP-2007-140353, a conductive film is electrically connected to a GND pad through a conductive resin. JP-2007-140353 describes that an organic insulating film below the pad connecting to the conductive film is removed.

SUMMARY OF THE INVENTION

The conductive resin is disposed on the GND pad so as to extend on the conductive film. When the viscosity of the conductive resin is high, the conductive resin rises high on the conductive film, so that the level of the conductive resin becomes higher than that of a polarizer in some cases. Especially when a substrate is reduced in thickness, the difference in level between the conductive film and the GND pad is reduced (the difference is 0.31 mm or less, for example). Therefore, the conductive resin does not easily flow downward, thereby making the rising of the conductive resin more evident. Accordingly, a conductive resin having low viscosity has to be used in such a case. On the other hand, when a conductive resin having low viscosity is used for suppressing the rising of the conductive resin, the conductive resin flows over a wide range. Therefore, there arises a problem that a wide region is required. Especially when a mounted component such as a driver or a flexible wiring board is mounted near the GND pad to which the conductive resin is electrically connected, is necessary to prevent short circuit. This problem becomes more obvious especially when the distance between the GND pad and the mounted component is reduced (1 mm or less, for example) due to the narrowing of a picture frame or an increase in resolution.

It is an object of the invention to provide a liquid crystal display device in which the flow range of a conductive resin can be limited even when the viscosity is reduced.

(1) A liquid crystal display device according to the invention includes: a first substrate having a first portion and a second portion; a pad formed in the first portion of the first substrate; a second substrate facing the second portion of the first substrate; a conductive film formed on the opposite face of the second substrate from the face facing the first substrate; liquid crystal arranged between the first substrate and the second substrate; a conductive resin disposed on the pad so as to extend on the conductive film and electrically connecting the pad with the conductive film; and an insulating layer formed on the first substrate and including a dam part arranged next to the conductive resin in the first portion, wherein the height from the surface of the pad to the surface of the conductive film is 0.31 mm or less in a position avoiding the insulating layer. According to the invention, since the dam part regulates the flow of a material for forming the conductive resin, the flow range of the material can be limited even when the viscosity is reduced.

(2) In the liquid crystal display device according to (1), the dam part may be arranged along one side of the pad.

(3) In the liquid crystal display device according to (1), the dam part may be arranged along two sides of the pad.

(4) In the liquid crystal display device according to (1), the dam part may be arranged along three sides of the pad.

(5) In the liquid crystal display device according to any one of (1) to (4), the pad may have a portion overlapping the dam part and a portion not overlapping the insulating layer, and the overlapping portion may be positioned on the dam part.

(6) In the liquid crystal display device according to any one of (1) to (4), the pad may have a portion overlapping the dam part and a portion not overlapping the insulating layer, and the overlapping portion may be positioned below the dam part.

(7) In the liquid crystal display device according to any one of (1) to (4), the pad may be formed so as not to overlap the dam part.

(8) In the liquid crystal display device according to any one of (1) to (4), the liquid crystal display device further includes a mounted component mounted on the first portion of the first substrate, and at least a part of the dam part may be arranged between the conductive resin and the mounted component.

(9) In the liquid crystal display device according to (8), the distance between the pad and the mounted component may be 1 mm or less.

(10) In the liquid crystal display device according to (9), the mounted component may be a driver.

(11) In the liquid crystal display device according to (9), the mounted component may be a flexible wiring board.

DESCRIPTION OF THE PREFERRED EMBODIMENTS

Hereinafter, embodiments of the invention will be described with reference to the drawings.

First Embodiment

Figure 1:
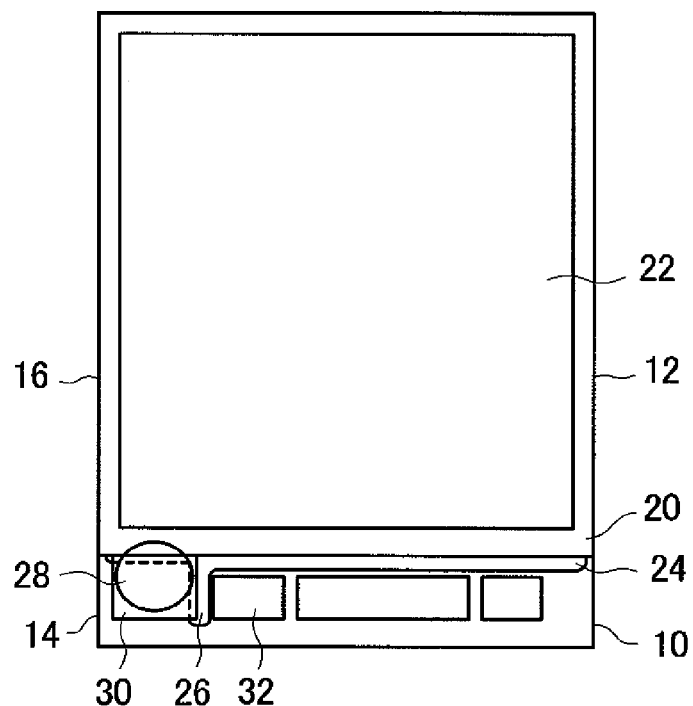
FIG. 1 is a plan view showing a liquid crystal display device according to a first embodiment of the invention.

FIG. 1 is a plan view showing a liquid crystal display device according to a first embodiment of the invention. FIG.

Figure 2:
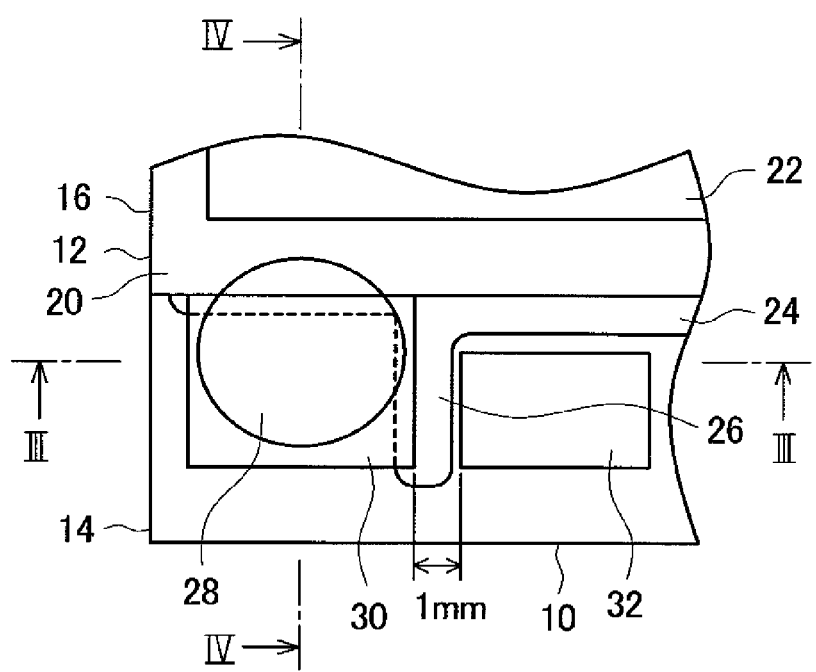
FIG. 2 is a partially enlarged view of the liquid crystal display device shown in FIG. 1.
Figure 3:
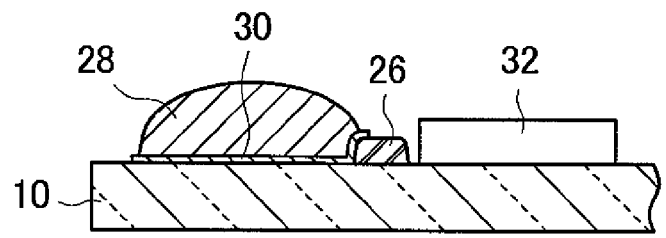
FIG. 3 is a cross-sectional view of the liquid crystal display device shown in FIG. 2 along the line III-III.
Figure 4:
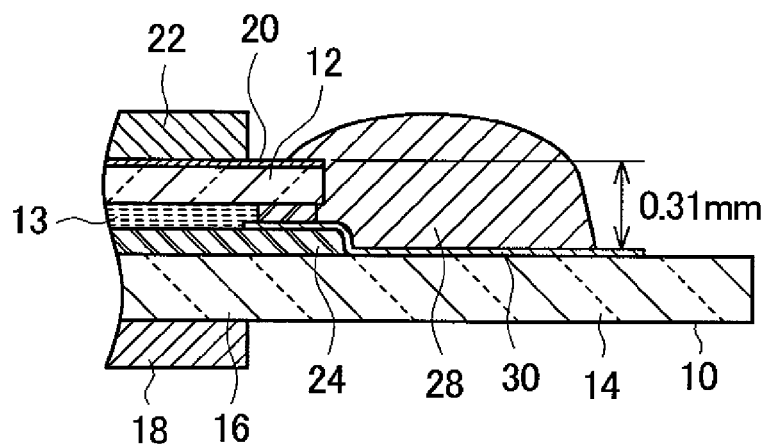
FIG. 4 is a cross-sectional view of the liquid crystal display device shown in FIG. 2 along the line IV-IV.

2 is a partially enlarged view of the liquid crystal display device shown in FIG. 1. FIG. 3 is a cross-sectional view of the liquid crystal display device shown in FIG. 2 along the line III-III. FIG. 4 is a cross-sectional view of the liquid crystal display device shown in FIG. 2 along the line IV-IV.

The liquid crystal display device has a first substrate 10 and a second substrate 12. The thickness of the second substrate 12 is 0.3 mm or less and preferably 0.21 mm or less (0.2 mm, for example). The thickness of the second substrate 12 is 0.05 mm or more in practice. The same applies to the thickness of the first substrate 10. The gap between the first substrate 10 and the second substrate 12 is 5 μm or less.

The first substrate 10 is a TFT substrate (or array substrate) including TFTs (Thin Film Transistors), pixel electrodes, and the like, which are not shown. The second substrate 12 is a color filter substrate including a black matrix and a colored layer, which are not shown. Liquid crystal 13 is arranged between the first substrate 10 and the second substrate 12. It is assumed that an IPS (In Plane Switching) system is employed as the driving system of the liquid crystal. Electrodes and wires are formed in accordance with the system.

The first substrate 10 includes a first portion 14 (peripheral region, for example) and a second portion 16 (display region, for example). The second substrate 12 is arranged so as to face the second portion 16 of the first substrate 10. A polarizer 18 is attached on the opposite face of the first substrate 10 from the second substrate 12.

A conductive film 20 is formed on the opposite face of the second substrate 12 from the face facing the first substrate 10. Since the conductive film 20 blocks an electric field, the display of the liquid crystal is not affected even when a high potential such as of static electricity is applied externally. The conductive film 20 is formed of a transparent conductive film such as of ITO (Indium Tin Oxide), for example. A polarizer 22 is attached on the conductive film 20. However, the conductive film 20 is exposed from the polarizer 22 on the end portion of the second substrate 12. The thickness of the conductive film 20 is about 15 nm.

An insulating layer 24 is formed on the face of the first substrate 10 that faces the second substrate 12. The insulating layer 24 can include a conductive layer made of a metal therein as long as the surface thereof is composed of a material (organic material such as a resin or inorganic material such as an oxide film or a nitride film) having electrical insulation properties. At least a part of the insulating layer 24 is formed on a portion of the first substrate 10 that does not overlap the second substrate 12 (that is, the first portion 14). Another part of the insulating layer 24 may be intervened between the first substrate 10 and the second substrate 12.

The insulating layer 24 includes a dam part 26 that blocks a fluent material (precursor of a conductive resin 28) flows on the first substrate 10. The dam part 26 is located at a position where the dam part does not overlap the second substrate 12 and extends in a direction away from the second substrate 12. The dam part 26 is arranged next to the conductive resin 28 (or a pad 30) (specifically, in a region shifted from the conductive resin 28 (or the pad 30) along a direction along the edge of the second substrate 12).

The pad 30 is formed in the first portion 14 of the first substrate 10. The pad 30 is formed of a transparent conductive film such as of ITO (Indium Tin Oxide), for example. The pad 30 can be formed by the same process as, for example, the pixel electrode or a counter electrode (using the same material at the same time). The thickness of the pad 30 is 100 nm or less. The pad 30 is connected at a predetermined potential (for example, GND) through a not-shown wire. The pad 30 may include a portion positioned between the first substrate 10 and the second substrate 12. Even in that case, however, the pad 30 is not preferably connected electrically to wires or electrodes used for driving the liquid crystal inside a liquid crystal panel for dissipating static electricity.

The pad 30 has a portion that overlaps the dam part 26 and a portion that does not overlap the insulating layer 24 (including the dam part 26). The portion that overlaps the dam part 26 is positioned on the dam part 26. The portion that does not overlap the insulating layer 24 is in direct and close contact with the first substrate 10 or in close contact with another, not-shown insulating film. A part of the pad 30 is formed on the insulating layer 24 between the first substrate 10 and the second substrate 12. The height from the surface of the pad 30 to the surface of the conductive film 20 is 0.31 mm or less (desirably 0.21 mm or less; and the lower limit being 0.05 mm or more in practice although not particularly limited) at a position avoiding the insulating layer 24 (including the dam part 26). That is, the liquid crystal display panel of the invention belongs to a thin liquid crystal display panel using a thin substrate.

The conductive resin 28 is disposed on the pad 30 so as to extend on the conductive film 20. The conductive resin 28 electrically connects the pad 30 with the conductive film 20. The conductive resin 28 is in a cured state at the time of completion. At the stage of manufacturing the liquid crystal display panel, a conductive paste having a viscosity of 10 Pa·s or more and 30 Pa·s or less is disposed and cured, whereby the conductive resin 28 is formed. That is, a conductive paste having a viscosity lower than usual before curing is used in the invention.

Amounted component 32 (chip component such as a driving driver, for example) is mounted on the first portion 14 of the first substrate 10. At least a part of the dam part 26 is arranged between the conductive resin 28 (or the pad 30) and the mounted component 32. Accordingly, the distance between the pad 30 and the mounted component 32 can be 1 mm or less. Therefore, the distance can be made shorter than usual (about 3 mm, for example) by using the dam part 26.

According to the embodiment, since the dam part 26 can regulate the flow of the conductive paste as the precursor of the conductive resin 28, the flow range thereof can be limited even when the viscosity is reduced. Therefore, since the mounted component 32 can be mounted closely to the conductive resin 28 and the pad 30, a region for mounting a plurality of mounted components can be assured.

Second Embodiment

Figure 5:
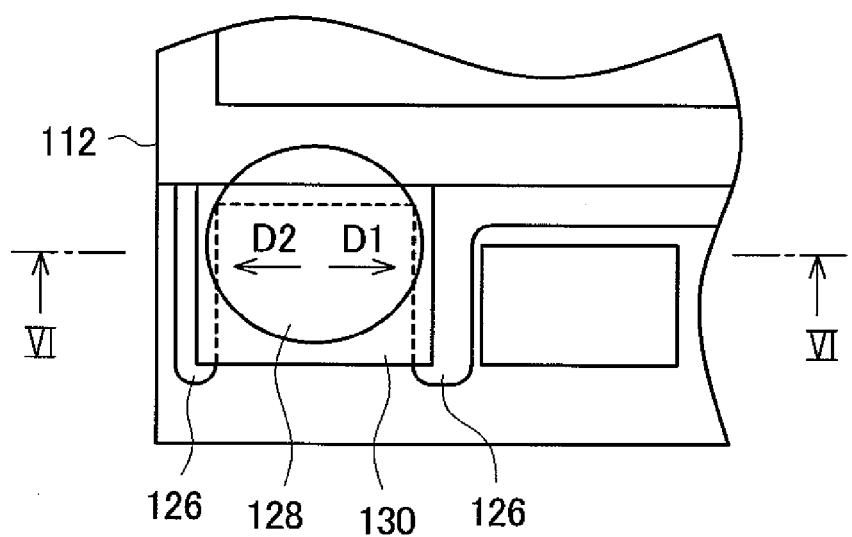
FIG. 5 is a partially enlarged view of a liquid crystal display device according to a second embodiment of the invention.
Figure 6:
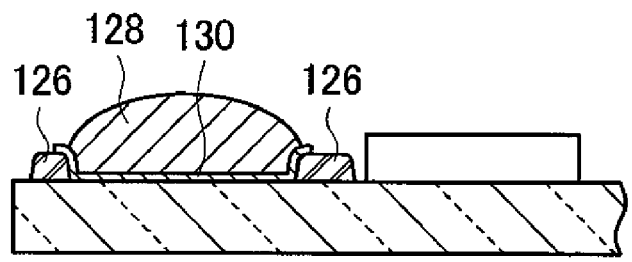
FIG. 6 is a cross-sectional view of the liquid crystal display device shown in FIG. 5 along the line VI-VI.

FIG. 5 is a partially enlarged view of a liquid crystal display device according to a second embodiment of the invention. FIG. 6 is a cross-sectional view of the liquid crystal display device shown in FIG. 5 along the line VI-VI.

In the embodiment, dam parts 126 are each arranged in a first region shifted from a conductive resin 128 (or a pad 130) in a first direction $D_1$ along the edge of a second substrate 112 and a second region shifted from the conductive resin 128 (or the pad 130) in a second direction $D_2$ opposite to the first direction $D_1$. That is, the dam parts 126 are disposed so as to interpose the conductive resin 128 (or the pad 130) therebetween.

According to the embodiment, the dam parts 126 can regulate the flow of the conductive resin 128 (conductive paste) both in the first direction $D_1$ and in the second direction $D_2$. The contents described in the first embodiment apply to other detailed configurations.

Third Embodiment

Figure 7:
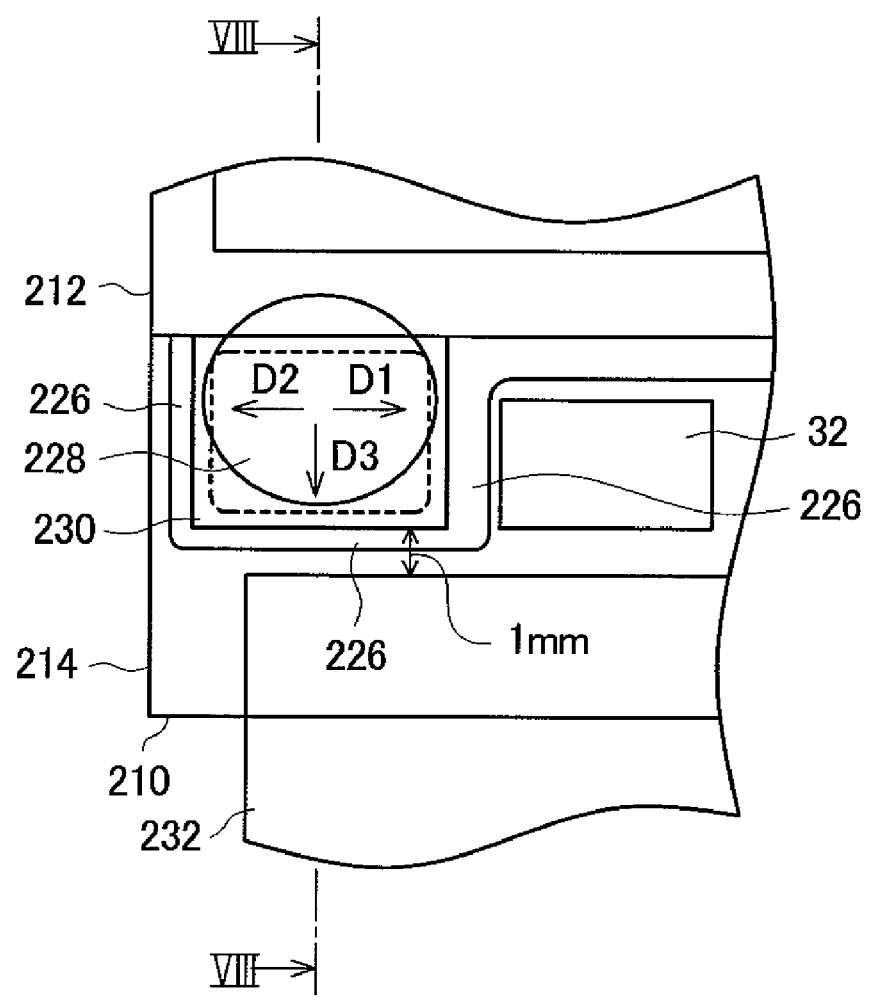
FIG. 7 is a partially enlarged view of a liquid crystal display device according to a third embodiment of the invention.
Figure 8:
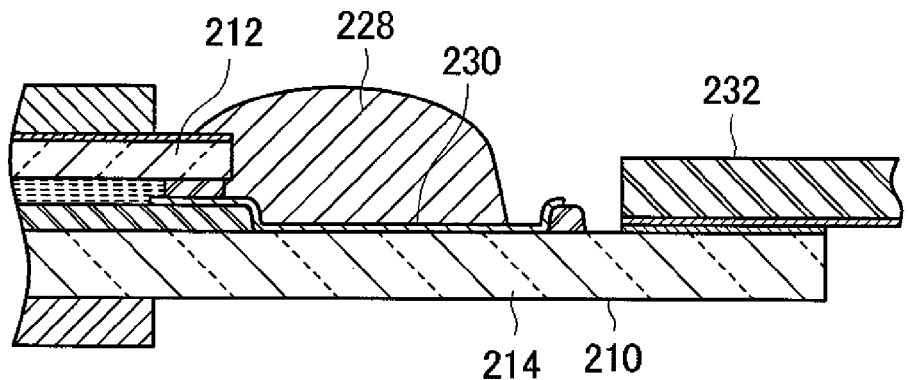
FIG. 8 is a cross-sectional view of the liquid crystal display device shown in FIG. 7 along the line VIII-VIII.

FIG. 7 is a partially enlarged view of a liquid crystal display device according to a third embodiment of the invention. FIG.

8 is a cross-sectional view of the liquid crystal display device shown in FIG. 7 along the line VIII-VIII.

In the embodiment, a dam part 226 is formed in a first region shifted from a conductive resin 228 (or a pad 230) in a first direction $D_1$ along the edge of a second substrate 212. A dam part 226 is also formed in a second region shifted from the conductive resin 228 (or the pad 230) in a second direction $D_2$ opposite to the first direction $D_1$. A dam part 226 is also formed in a third region shifted from the conductive resin 228 (or the pad 230) in a direction away from the second substrate 212 (third direction $D_3$ crossing the first direction $D_1$ and the second direction $D_2$) and connecting the first region with the second region. These dam parts 226 are continuously arranged. That is, the dam parts 226 are disposed so as to surround the conductive resin 228 (or the pad 230) from the three directions.

A second mounted component 232 (flexible wiring board, for example) is mounted on a first portion 214 of a first substrate 210 aside from a mounted component 32 (chip component such as a driving driver, for example). The dam part 226 at the position shifted from the second substrate 212 in the third direction $D_3$ is arranged between the conductive resin 228 (or the pad 230) and the second mounted component 232. Accordingly, the distance between the pad 230 and the second mounted component 232 can be 1 mm or less.

According to the embodiment, the dam parts 226 can regulate the flow of the conductive resin 228 (conductive paste) in the three directions of the first direction $D_1$, the second direction $D_2$, and the third direction $D_3$. The contents described in the first embodiment apply to other detailed configurations.

First Modified Example

Figure 9:
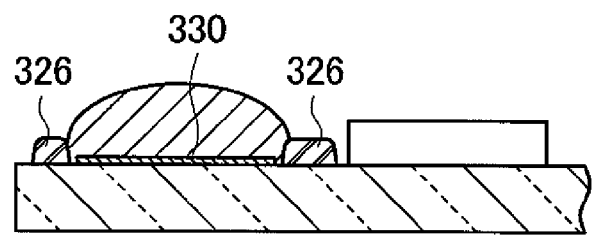
FIG. 9 is a partially enlarged cross-sectional view of a liquid crystal display device according to a first modified example of the embodiments of the invention.

FIG. 9 is a partially enlarged cross-sectional view of a liquid crystal display device according to a first modified example of the embodiments of the invention. In the modified example, a pad 330 is formed so as not to overlap dam parts 326. The modified example can be applied to any of the first to third embodiments.

Second Modified Example

Figure 10:
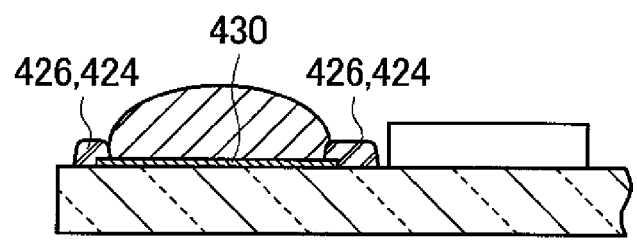
FIG. 10 is a partially enlarged cross-sectional view of a liquid crystal display device according to a second modified example of the embodiments of the invention.

FIG. 10 is a partially enlarged cross-sectional view of a liquid crystal display device according to a second modified example of the embodiments of the invention. In the modified example, a pad 430 has portions that overlap dam parts 426 and a portion that does not overlap an insulating layer 424 (including the dam parts 426). The portions of the pad 430 that overlap the dam parts 426 are positioned below the dam parts 426. The modified example can be applied to any of the first to third embodiments.

The invention is not limited to the above embodiments but can be modified in a various manner. For example, each of the configurations described in the embodiments can be replaced with another configuration substantially the same as those of the embodiments, another configuration providing the same operation and effect as those of the embodiments, or another configuration by which the same object can be achieved.

What is claimed is:

1. A liquid crystal display device comprising:
   a first substrate having a first portion and a second portion;
   a pad formed in the first portion of the first substrate;
   a second substrate facing the second portion of the first substrate;
   a conductive film formed on the opposite face of the second substrate from the face facing the first substrate;
   liquid crystal arranged between the first substrate and the second substrate;
   a conductive resin disposed on the pad so as to extend on the conductive film and electrically connecting the pad with the conductive film; and
   an insulating layer formed on the first substrate and including a dam part arranged next to the conductive resin in the first portion, wherein
   the height from the surface of the pad to the surface of the conductive film is 0.31 mm or less in a position avoiding the insulating layer.

2. The liquid crystal display device according to claim 1, wherein
   the dam part is arranged along one side of the pad.

3. The liquid crystal display device according to claim 2, wherein
   the pad has a portion overlapping the dam part and a portion not overlapping the insulating layer, and the overlapping portion is positioned on the dam part.

4. The liquid crystal display device according to claim 2, wherein
   the pad has a portion overlapping the dam part and a portion not overlapping the insulating layer, and the overlapping portion is positioned below the dam part.

5. The liquid crystal display device according to claim 2, wherein
   the pad is formed so as not to overlap the dam part.

6. The liquid crystal display device according to claim 2, further comprising a mounted component mounted on the first portion of the first substrate, wherein
   at least a part of the dam part is arranged between the conductive resin and the mounted component.

7. The liquid crystal display device according to claim 1, wherein
   the dam part is arranged along two sides of the pad.

8. The liquid crystal display device according to claim 7, wherein
   the pad has a portion overlapping the dam part and a portion not overlapping the insulating layer, and the overlapping portion is positioned on the dam part.

9. The liquid crystal display device according to claim 7, wherein
   the pad has a portion overlapping the dam part and a portion not overlapping the insulating layer, and the overlapping portion is positioned below the dam part.

10. The liquid crystal display device according to claim 7, wherein
    the pad is formed so as not to overlap the dam part.

11. The liquid crystal display device according to claim 7, further comprising a mounted component mounted on the first portion of the first substrate, wherein
    at least a part of the dam part is arranged between the conductive resin and the mounted component.

12. The liquid crystal display device according to claim 1, wherein
    the dam part is arranged along three sides of the pad.

13. The liquid crystal display device according to claim 1, wherein
    the pad has a portion overlapping the dam part and a portion not overlapping the insulating layer, and the overlapping portion is positioned on the dam part.

14. The liquid crystal display device according to claim 1, wherein
    the pad has a portion overlapping the dam part and a portion not overlapping the insulating layer, and the overlapping portion is positioned below the dam part.

15. The liquid crystal display device according to claim 1, wherein
    the pad is formed so as not to overlap the dam part.

16. The liquid crystal display device according to claim 1, further comprising a mounted component mounted on the first portion of the first substrate, wherein
  at least a part of the dam part is arranged between the conductive resin and the mounted component.

17. The liquid crystal display device according to claim 16, wherein
  the distance between the pad and the mounted component is 1 mm or less.

18. The liquid crystal display device according to claim 17, wherein
  the mounted component is a driver.

19. The liquid crystal display device according to claim 17, wherein
  the mounted component is a flexible wiring board.

\* \* \* \* \*